US010047214B2

(12) United States Patent
Henze et al.

(10) Patent No.: US 10,047,214 B2
(45) Date of Patent: Aug. 14, 2018

(54) FLAME-RETARDANT THERMOPLASTIC POLYURETHANE

(71) Applicant: BASF SE, Ludwigshafen (DE)

(72) Inventors: Oliver Steffen Henze, Lemfoerde (DE); Oliver Muehren, Bramsche (DE); Hans Rudolph, Bad Essen Harpenfeld (DE); Dirk Rosenbohm, Rahden (DE)

(73) Assignee: BASF SE, Ludwigshafen (DE)

( * ) Notice: Subject to any disclaimer, the term of this patent is extended or adjusted under 35 U.S.C. 154(b) by 67 days.

(21) Appl. No.: 15/106,677

(22) PCT Filed: Dec. 3, 2014

(86) PCT No.: PCT/EP2014/076338
§ 371 (c)(1),
(2) Date: Jun. 20, 2016

(87) PCT Pub. No.: WO2015/090953
PCT Pub. Date: Jun. 25, 2015

(65) Prior Publication Data
US 2017/0002179 A1    Jan. 5, 2017

(30) Foreign Application Priority Data
Dec. 20, 2013  (EP) .................................... 13199092

(51) Int. Cl.
| C08L 75/04 | (2006.01) |
| C08K 5/523 | (2006.01) |
| C08G 18/48 | (2006.01) |
| C08G 18/66 | (2006.01) |
| C08G 18/75 | (2006.01) |
| C08G 18/76 | (2006.01) |
| C08G 18/32 | (2006.01) |
| C08L 75/06 | (2006.01) |
| H01B 3/30 | (2006.01) |
| H01B 7/295 | (2006.01) |
| C08K 3/20 | (2006.01) |
| H01B 3/00 | (2006.01) |
| H01B 3/10 | (2006.01) |
| H01B 13/24 | (2006.01) |
| C08K 5/5333 | (2006.01) |
| C08L 75/08 | (2006.01) |
| C08K 3/22 | (2006.01) |

(52) U.S. Cl.
CPC .......... *C08K 5/523* (2013.01); *C08G 18/3206* (2013.01); *C08G 18/4854* (2013.01); *C08G 18/664* (2013.01); *C08G 18/6674* (2013.01); *C08G 18/758* (2013.01); *C08G 18/7664* (2013.01); *C08K 3/20* (2013.01); *C08K 5/5333* (2013.01); *C08L 75/06* (2013.01); *C08L 75/08* (2013.01); *H01B 3/002* (2013.01); *H01B 3/10* (2013.01); *H01B 3/302* (2013.01); *H01B 7/295* (2013.01); *H01B 13/24* (2013.01); *C08K 2003/2227* (2013.01); *C08L 75/04* (2013.01); *C08L 2205/02* (2013.01)

(58) Field of Classification Search
None
See application file for complete search history.

(56) References Cited

U.S. PATENT DOCUMENTS

| 4,381,364 | A | 4/1983 | Georgacopoulos et al. |
| 2012/0202061 | A1 | 8/2012 | Lu et al. |
| 2013/0059955 | A1* | 3/2013 | Tai .......................... C08K 5/521 524/114 |
| 2013/0081853 | A1 | 4/2013 | Mundra et al. |
| 2013/0245169 | A1* | 9/2013 | Henze ..................... C08L 75/04 524/127 |
| 2013/0245170 | A1 | 9/2013 | Henze et al. |

FOREIGN PATENT DOCUMENTS

| DE | 101 03 424 A1 | 8/2002 |
| DE | 103 43 121 A1 | 4/2005 |
| EP | 0 617 079 A2 | 9/1994 |
| EP | 0 922 552 A1 | 6/1999 |
| EP | 1 167 429 A1 | 1/2002 |
| WO | 03/066723 A2 | 8/2003 |
| WO | 2006/072461 A1 | 7/2006 |
| WO | 2006/121549 A1 | 11/2006 |
| WO | 2006/124549 A1 | 11/2006 |
| WO | 2011/072458 A1 | 6/2011 |
| WO | 2011/150567 A1 | 12/2011 |

OTHER PUBLICATIONS

Dieter, J. W., Byrne, C. A., "Aliphatic polyurethane elastomers with high performance properties". Polymer Engineering & Science; May 1987, vol. 27, pp. 673-683. (Year: 1987).*
Estane 58219 product data sheet, Lubrizol Advanced Materials, Inc., 2014 (Year: 2014).*
Richard Vieweg, et al., "Polyurethane Herstellung, Eigenshaften Verarbeitung und Anwendung," Kunststoff-Handbuch, Band VII, 1966, 12 pages.
Roger N. Rothon, "Particulate-Flled Polymer Composites," 2$^{nd}$ Edition, 2003, pp. 153-206.
International Search Report dated Feb. 10, 2015 in PCT/EP2014/076338 Filed Dec. 3, 2014.

* cited by examiner

*Primary Examiner* — Richard A Huhn
(74) *Attorney, Agent, or Firm* — Oblon, McClelland, Maier & Neustadt, L.L.P.

(57) ABSTRACT

The present invention relates to compositions comprising at least one thermoplastic polyurethane TPU-1 based on an aliphatic diisocyanate, at least one metal hydroxide and at least one phosphorus-containing flame retardant, especially those compositions which further comprise at least one thermoplastic polyurethane TPU-2 based on an aromatic diisocyanate. The present invention further relates to the use of such compositions for production of cable sheaths.

18 Claims, No Drawings

FLAME-RETARDANT THERMOPLASTIC POLYURETHANE

The present invention relates to compositions comprising at least one thermoplastic polyurethane TPU-1 based on an aliphatic diisocyanate, at least one metal hydroxide and at least one phosphorus-containing flame retardant, especially those compositions which further comprise at least one thermoplastic polyurethane TPU-2 based on an aromatic diisocyanate. The present invention further relates to the use of such compositions for production of cable sheaths.

Cables produced from PVC have the disadvantage of evolving toxic gases on combustion. Therefore, products based on thermoplastic polyurethanes are being developed, these having lower smoke gas densities and smoke gas toxicities and having good mechanical properties, abrasion resistance and flexibility. Because of the inadequate flammability performance, compositions based on thermoplastic polyurethanes are being developed, these comprising various flame retardants.

In these cases, it is possible to add both halogenated and halogen-free flame retardants to the thermoplastic polyurethanes (TPUs). The thermoplastic polyurethanes comprising halogen-free flame retardants generally have the advantage of evolving less toxic and less corrosive smoke gases when burnt. Halogen-free flame-retardant TPUs are described, for example, in EP 0 617 079 A2, WO 2006/121549 A1 or WO 03/066723 A2.

To render thermoplastic polyurethanes flame-retardant in a halogen-free manner, it is also possible to use metal hydroxides alone or in combination with phosphorus-containing flame retardants and/or sheet silicates.

EP 1 167 429 A1 relates to flame-retardant thermoplastic polyurethanes for cable sheaths. The compositions comprise a polyurethane, preferably a polyether-based polyurethane, aluminum hydroxide or magnesium hydroxide and phosphoric esters. US 2013/0059955 A1 also discloses halogen-free TPU compositions comprising phosphate-based flame retardants.

DE 103 43 121 A1 discloses flame-retardant thermoplastic polyurethanes comprising a metal hydroxide, especially aluminum hydroxide and/or magnesium hydroxide. The thermoplastic polyurethanes are characterized by their molecular weight. The compositions may further comprise phosphates or phosphonates. With regard to the starting materials for the synthesis of the thermoplastic polyurethanes, compounds reactive toward isocyanates that are disclosed are, as well as polyesterols and polyetherols, also polycarbonatediols, preference being given to polyether polyols. No examples of polycarbonatediols are cited. According to DE 103 43 121 A1, rather than one polyol, it is also possible to use mixtures of different polyols. Additionally disclosed are high filler levels, i.e. high proportions of metal hydroxides and further solid components in the thermoplastic polyurethane, which lead to worsening of the mechanical properties.

In order to counteract the difficulties frequently occur as a result of the high filler levels required because of the for the flame test and to achieve the requisite mechanical properties, smoke gas densities and smoke gas toxicities, further additives are frequently added.

For instance, WO 2011/072458 A1 discloses flexible halogen-free flame-retardant compositions comprising, as well as a thermoplastic polyurethane, also about 5% by weight to about 50% by weight of an olefin block copolymer (OBC) and from about 30% by weight to about 70% by weight of a flame retardant. These systems may be mono- or biphasic.

US 2013/0081853 A1 relates to compositions, preferably halogen-free flame-retardant compositions, comprising a TPU polymer and a polyolefin, and also phosphorus-based flame retardants and further additives. According to US 2013/0081853 A1, the compositions have good mechanical properties.

U.S. Pat. No. 4,381,364 discloses thermoplastic compositions comprising mixtures of a thermoplastic polyurethane with a polyvinyl halide resin and a diene-nitrile copolymer rubber. Use as cable sheathing is likewise disclosed.

US2012/0202061 A1 also discloses flame retardant compositions comprising a thermoplastic polyurethane, a metal hydrate and phosphorus-based flame retardant. The compositions feature good flame retardancy properties and high insulation resistance.

However, the compositions known from the prior art either do not exhibit adequate mechanical properties or have only inadequate flammability properties, for example smoke gas densities.

Proceeding from the prior art, it was accordingly an object of the present invention to provide flame-retardant thermoplastic polyurethanes which have good mechanical properties, exhibit good flame retardancy properties and simultaneously have good mechanical and chemical stability.

According to the invention, this object is achieved by a composition comprising at least one thermoplastic polyurethane TPU-1 based on an aliphatic diisocyanate, at least one metal hydroxide and at least one phosphorus-containing flame retardant.

The compositions of the invention comprise at least one thermoplastic polyurethane based on an aliphatic diisocyanate, at least one metal hydroxide and at least one phosphorus-containing flame retardant. It has been found that, surprisingly, the compositions of the invention have properties improved over the compositions known from the prior art. In particular, the compositions of the invention have good properties in relation to the smoke gas densities, and good mechanical properties. One example of a measure of the mechanical properties is the tensile strength or elongation at break of the shaped bodies produced from the compositions of the invention prior to aging. Tensile strength is determined in accordance with DIN 53504.

Preferably, the compositions of the invention additionally comprise, as well as the TPU-1, a further TPU-2, where TPU-2 is based on an aromatic diisocyanate. The composition of the invention preferably comprises TPU-2 in an amount in the range from 0.1 to 65% based on the overall composition.

In a further embodiment, the present invention therefore relates to a composition as described above, wherein the proportion of the thermoplastic polyurethane TPU-2 in the composition is in the range from 0.1 to 65% based on the overall composition.

According to the invention, the amount of TPU-1 in the composition of the invention and also the amount of TPU-2 may vary within wide ranges. For example, the proportion of TPU-1 in the composition of the invention is in the range from 5% to 35% based on the overall composition. The proportion of TPU-2 in the composition of the invention is in the range from 15% to 65% based on the overall composition.

The composition of the invention comprises the at least one thermoplastic polyurethane TPU-1 preferably in an amount in the range from 15% by weight to 35% by weight, based on the overall composition, preferably in the range from 10% by weight to 25% by weight, further preferably in the range from 12% by weight to 20% by weight and especially preferably in the range from 14% by weight to 18% by weight, based in each case on the overall composition.

The composition of the invention comprises the at least one thermoplastic polyurethane TPU-2 preferably in an amount in the range from 15% by weight to 65% by weight, based on the overall composition, preferably in the range from 18% by weight to 55% by weight, further preferably in the range from 20% by weight to 45% by weight and especially preferably in the range from 25% by weight to 35% by weight, based in each case on the overall composition.

In a further embodiment, the present invention therefore relates to a composition as described above, wherein the proportion of the thermoplastic polyurethane TPU-1 in the composition is in the range from 5% to 35% based on the overall composition.

In a further embodiment, the present invention therefore relates to a composition as described above, wherein the proportion of the thermoplastic polyurethane TPU-2 in the composition is in the range from 15% to 65% based on the overall composition.

As well as the at least one thermoplastic polyurethane TPU-1, at least one metal hydroxide and at least one phosphorus-containing flame retardant, the composition of the invention may comprise further additives.

Thermoplastic Polyurethanes

Thermoplastic polyurethanes are known in principle. They are typically prepared by reacting the components (a) isocyanates and (b) compounds reactive toward isocyanates and optionally (c) chain extenders, optionally in the presence of at least one (d) catalyst and/or (e) customary auxiliaries and/or additives. The components (a) isocyanate, (b) compounds reactive toward isocyanates, (c) chain extenders are also referred to, individually or collectively, as formation components.

The compositions of the invention comprise at least one thermoplastic polyurethane TPU-1 based on an aliphatic diisocyanate. Preferably, the compositions of the invention further comprise at least one thermoplastic urethane TPU-2 that is based on an aliphatic diisocyanate. Accordingly, the TPU-1 is prepared using, as component (a), an aliphatic isocyanate, and TPU-2 is prepared using an aromatic isocyanate.

It has been found that it is possible to achieve low smoke gas densities especially by virtue of the high proportion of TPU-1 in the compositions of the invention. For the preferred compositions comprising not only TPU-1 but also TPU-2, the mechanical properties have also been further optimized as well as the smoke gas densities and flammability properties.

Organic isocyanates (a) used for the preparation of TPU-1 are preferably aliphatic or cycloaliphatic isocyanates, further preferably tri-, tetra-, penta-, hexa-, hepta- and/or octamethylene diisocyanate, 2-methylpentamethylene 1,5-diisocyanate, 2-ethylbutylene 1,4-diisocyanate, pentamethylene 1,5-diisocyanate, butylene 1,4-diisocyanate, 1-isocyanato-3,3,5-trimethyl-5-isocyanatomethylcyclohexane (isophorone diisocyanate, IPDI), 1,4- and/or 1,3-bis(isocyanatomethyl) cyclohexane (HXDI), cyclohexane 1,4-diisocyanate, 1-methylcyclohexane 2,4- and/or -2,6-diisocyanate and/or dicyclohexylmethane 4,4'-, 2,4'- and 2,2'-diisocyanate.

In a further embodiment, the present invention therefore relates to a composition as described above, wherein the thermoplastic polyurethane TPU-1 is based on at least one aliphatic diisocyanate selected from the group consisting of hexamethylene diisocyanate and di(isocyanatocyclohexyl) methane.

Organic isocyanates (a) used for the preparation of TPU-2 are preferably araliphatic and/or aromatic isocyanates, further preferably diphenylmethane 2,2'-, 2,4'- and/or 4,4'-diisocyanate (MDI), naphthylene1,5-diisocyanate (NDI), tolylene 2,4- and/or 2,6-diisocyanate (TDI), diphenylmethane diisocyanate, 3,3'-dimethyl diphenyl diisocyanate, 1,2-diphenylethane diisocyanate and/or phenylene diisocyanate. Particular preference is given to using 4,4'-MDI.

In a further embodiment, the present invention therefore relates to a composition as described above, wherein the thermoplastic polyurethane TPU-2 is based on diphenylmethane diisocyanate (MDI).

According to the invention, compounds (b) used that are reactive toward isocyanates may in principle be any compounds which have functional groups reactive toward isocyanates and are known to those skilled in the art. As compounds (b) reactive toward isocyanates, preference is given to using a polycarbonatediol or a polytetrahydrofuran polyol for TPU-1 and TPU-2. Suitable polytetrahydrofuran polyols have, for example, a molecular weight in the range from 500 to 5000, preferably 500 to 2000, more preferably 800 to 1200.

According to the invention, preference is given to using at least one polycarbonatediol, preferably an aliphatic polycarbonatediol. Suitable polycarbonatediols are, for example, polycarbonatediols based on alkanediols. Suitable polycarbonatediols are strictly difunctional OH-functional polycarbonatediols, preferably strictly difunctional OH-functional aliphatic polycarbonatediols. Suitable polycarbonatediols are based, for example, on butanediol, pentanediol or hexanediol, especially butane-1,4-diol, pentane-1,5-diol, hexane-1,6-diol, 3-methylpentane-1,5-diol or mixtures thereof, more preferably butane-1,4-diol, pentane-1,5-diol, hexane-1,6-diol or mixtures thereof. Preference is given in the context of the present invention to using polycarbonatediols based on butanediol and hexanediol, polycarbonatediols based on pentanediol and hexanediol, polycarbonatediols based on hexanediol, and mixtures of two or more of these polycarbonatediols.

Preferably, the polycarbonatediols used have a number-average molecular weight Mn in the range from 500 to 4000, determined via GPC, preferably in the range from 650 to 3500, determined via GPC, more preferably in the range from 800 to 3000, determined via GPC.

The present invention also relates, in a further preferred embodiment, to a composition as described above, wherein the at least one polycarbonatediol is selected from the group consisting of polycarbonatediols based on butanediol and hexanediol, polycarbonatediols based on pentanediol and hexanediol, polycarbonatediols based on hexanediol, and mixtures of two or more of these polycarbonatediols, and wherein the polycarbonatediol has a number-average molecular weight Mn in the range from 500 to 4000, determined via GPC.

Further preferred are copolycarbonatediols based on the diols pentane-1,5-diol and hexane-1,6-diol, preferably having a molecular weight $M_n$ of about 2000 g/mol.

Chain extenders (c) used may preferably be aliphatic, araliphatic, aromatic and/or cycloaliphatic compounds having a molecular weight of 0.05 kg/mol to 0.499 kg/mol, preferably difunctional compounds, for example diamines and/or alkanediols having 2 to 10 carbon atoms in the alkylene radical, di-, tri-, tetra-, penta-, hexa-, hepta-, octa-, none- and/or decaalkylene glycols having 3 to 8 carbon atoms, especially 1,2-ethylene glycol, propane-1,3-diol, butane-1,4-diol, hexane-1,6-diol, preferably corresponding oligo- and/or polypropylene glycols, where it is also possible to use mixtures of the chain extenders. Preferably, the compounds (c) have only primary hydroxyl groups; most preferred is butane-1,4-diol.

Catalysts (d) which accelerate particularly the reaction between the NCO groups of the diisocyanates (a) and the hydroxyl groups of the compound (b) reactive toward isocyanates and the chain extender (c), in a preferred embodiment, are tertiary amines, especially triethylamine, dimethylcyclohexylamine, N-methylmorpholine. N,N'-dimethylpiperazine, 2-(dimethylaminoethoxy)ethanol, diazabicyclo[2.2.2]octane; in another preferred embodiment, these are organic metal compounds such as titanic esters, iron compounds, preferably iron(III) acetylacetonate, tin compounds, preferably tin diacetate, tin dioctoate, tin dilaurate or the dialkyltin salts of aliphatic carboxylic acids, preferably dibutyltin diacetate, dibutyltin dilaurate, or bismuth salts in which bismuth is preferably in the 2 or 3 oxidation state, especially 3. Preference is given to salts of carboxylic acids. Carboxylic acids used are preferably carboxylic acids having 6 to 14 carbon atoms, more preferably having 8 to 12 carbon atoms. Examples of suitable bismuth salts are bismuth(III) neodecanoate, bismuth 2-ethylhexanoate and bismuth octanoate.

The catalysts (d) are preferably used in amounts of 0.0001 to 0.1 part by weight per 100 parts by weight of the compound (b) reactive with isocyanates. Preference is given to using tin catalysts, especially tin dioctoate.

As well as catalysts (d), it is also possible to add customary auxiliaries (e) to the formation components (a) to (c). Examples include surface-active substances, fillers, further flame retardants, nucleating agents, oxidation stabilizers, gliding and demolding aids, dyes and pigments, optionally stabilizers, for example against hydrolysis, light, heat or discoloration, inorganic and/or organic fillers, reinforcing agents and plasticizers. Suitable auxiliaries and additives can be found, for example, in the Kunststoffhandbuch [Plastics Handbook], volume VII, published by Vieweg and Höchtlen, Carl Hanser Verlag, Munich 1966 (p. 103-113).

Suitable preparation processes for thermoplastic polyurethanes are disclosed, for example, in EP 0922552 A1, DE 10103424 A1 or WO 2006/072461 A1. The preparation is typically effected in a belt system or a reaction extruder, but can also be effected on the laboratory scale, for example in a manual casting method. Depending on the physical properties of the components, they are all mixed directly with one another or individual components are premixed and/or prereacted, for example to give prepolymers, and only then subjected to polyaddition. In a further embodiment, a thermoplastic polyurethane is first prepared from the formation components, optionally together with catalyst, into which auxiliaries may optionally also be incorporated. In that case, at least one flame retardant is introduced into this material and distributed homogeneously. The homogeneous distribution is preferably effected in an extruder, preferably in a twin-shaft extruder. To adjust the hardness of TPU-1 or TPU-2, the amounts used of formation components (b) and (c) can be varied within relatively broad molar ratios, typically with rising hardness as the content of chain extender (c) increases.

For preparation of thermoplastic polyurethanes, for example those having a Shore A hardness of less than 95, preferably of 95 to 80 Shore A, more preferably about 85 A, it is possible, for example, to use the essentially difunctional polyhydroxyl compounds (b) and chain extenders (c) advantageously in molar ratios of 1:1 to 1:5, preferably 1:1.5 to 1:4.5, such that the resulting mixtures of the formation components (b) and (c) have a hydroxyl equivalent weight of greater than 200 and especially of 230 to 450, whereas, for preparation of harder TPUs, for example those having a Shore A hardness of greater than 98, preferably of 55 to 75 Shore D, the molar ratios of (b):(c) are in the range from 1:5.5 to 1:15, preferably from 1:6 to 1:12, such that the mixtures of (b) and (c) obtained have a hydroxyl equivalent weight of 110 to 200, preferably of 120 to 180.

According to the invention, TPU-1 preferably has a hardness in the range from 85 A to 65 D, determined in accordance with DIN ISO 7619-1, further preferably in the range from 90 A to 60 D, determined in accordance with DIN ISO 7619-1.

According to the invention, TPU-2 preferably has a hardness in the range from 80 A to 95 A, determined in accordance with DIN ISO 7619-1, further preferably in the range from 85 A to 90 A, determined in accordance with DIN ISO 7619-1.

In a further embodiment, the present invention therefore relates to a composition as described above, wherein the thermoplastic polyurethane TPU-1 has a Shore hardness in the range from 85 A to 65 D, determined in accordance with DIN ISO 7619-1.

In a further embodiment, the present invention therefore relates to a composition as described above, wherein the thermoplastic polyurethane TPU-2 has a Shore hardness in the range from 80 A to 95 A, determined in accordance with DIN ISO 7619-1.

To prepare the thermoplastic polyurethanes of the invention, the formation components (a), (b) and (c) are preferably reacted in the presence of catalysts (d) and optionally auxiliaries and/or additives (e) in such amounts that the ratio of equivalents of NCO groups in the diisocyanates (a) to the sum total of the hydroxyl groups in the formation components (b) and (c) is 0.9 to 1.1:1, preferably 0.95 to 1.05:1 and especially about 0.96 to 1.0:1.

Preferably, TPU-1 has a molecular weight greater than 100 000 Da, and TPU-2 preferably a molecular weight in the range from 50 000 to 150 000 Da. The upper limit for the number-average molecular weight of the thermoplastic polyurethanes is generally determined by the processibility, and also the desired spectrum of properties.

In a further embodiment, the present invention therefore relates to a composition as described above, wherein the thermoplastic polyurethane TPU-1 has a molecular weight in the range from 100 000 Da to 400 000 Da. In a further embodiment, the present invention therefore relates to a composition as described above, wherein the thermoplastic polyurethane TPU-2 has a molecular weight in the range from 50 000 to 150 000 Da.

The composition of the invention comprises the at least one thermoplastic polyurethane in an amount in the range from 15% by weight to 65% by weight, based on the overall composition, preferably in the range from 20% by weight to 55% by weight, further preferably in the range from 23% by weight to 45% by weight and especially preferably in the range from 26% by weight to 35% by weight, based in each case on the overall composition.

In one embodiment, for preparation of the compositions of the invention, thermoplastic polyurethane and flame retardant are processed in one step. In another preferred embodiment, for preparation of the compositions of the invention, a reaction extruder, a belt system or other suitable apparatus is firstly used to prepare a thermoplastic polyurethane, preferably in pellet form, into which a further TPU and a further flame retardant are then optionally introduced in at least one further step, or else two or more steps.

The mixing of the thermoplastic polyurethane with the polymer and the at least one flame retardant, especially with the at least one metal hydroxide, the at least one phosphorus-containing flame retardant, is effected in a mixing unit which is preferably an internal kneader or an extruder, preferably a twin-shaft extruder. The metal hydroxide is preferably an aluminum hydroxide. In a preferred embodiment, at least one flame retardant introduced into the mixing unit in the at least one further step is in liquid form, i.e. in liquid form at a temperature of 21° C. In another preferred embodiment of the use of an extruder, the flame retardant introduced is liquid at a temperature that exists behind the intake point in flow direction of the material charge in the extruder.

Metal Hydroxide

The composition of the invention comprises at least one metal hydroxide. In the event of fire, metal hydroxides released exclusively water and therefore do not form any toxic or corrosive smoke gas products. Furthermore, these hydroxides are capable of reducing smoke gas density in the event of fire. However, a disadvantage of these substances is that, in some cases, they promote the hydrolysis of thermoplastic polyurethanes and also affect the oxidative aging of the polyurethanes.

Suitable hydroxides in the context of the present invention are preferably those of magnesium, calcium, zinc and/or aluminum or mixtures thereof. More preferably, the metal hydroxide is selected from the group consisting of aluminum hydroxides, aluminum oxide hydroxides, magnesium hydroxide and a mixture of two or more of these hydroxides.

Accordingly, the present invention, in a further embodiment, also relates to a composition as described above, wherein the metal hydroxide is selected from the group consisting of aluminum hydroxides, aluminum oxide hydroxides, magnesium hydroxide and a mixture of two or more of these hydroxides.

A preferred mixture is aluminum hydroxide and magnesium hydroxide. Particular preference is given to magnesium hydroxide or aluminum hydroxide. Very particular preference is given to aluminum hydroxide.

Accordingly, the present invention, in a further embodiment, also relates to a composition as described above, wherein the metal hydroxide is aluminum hydroxide.

The proportion of the at least one metal hydroxide in the compositions of the invention is preferably in the range from 25% by weight to 65% by weight. At higher filler levels, the mechanical properties of the corresponding polymer materials worsen in an unacceptable manner. More particularly, tensile strength and elongation at break, which are important for cable insulation, decline to an unacceptable degree. Preferably, the proportion of the metal hydroxide in the composition of the invention is in the range from 40% by weight to 62% by weight, further preferably in the range from 50% by weight to 60% by weight, especially preferably in the range from 55% to 58%, based in each case on the overall composition.

In a further embodiment, the present invention therefore relates to a composition as described above, wherein the proportion of the metal hydroxide in the composition is in the range from 25% to 65% based on the overall composition.

The metal hydroxides used in accordance with the invention typically have a specific surface area of 2 m$^2$/g to 150 m$^2$/g, but the specific surface area is preferably between 2 m$^2$/g and 9 m$^2$/g, further preferably between 3 m$^2$/g and 8 m$^2$/g, more preferably between 3 m$^2$/g and 5 m$^2$/g. The specific surface area is determined by the BET method according to DIN ISO 9277:2003-05 with nitrogen.

Coated Metal Hydroxides

According to the invention, the surface of the metal hydroxides may at least partly be enveloped by a shell, also referred to at least partly as envelope. The shell can be equated with the commonly used term coating or surface treatment. The shell adheres on the metal hydroxide in a purely physical manner either as a result of form-fitting or van der Waals forces, or is chemically bonded to the metal hydroxide. This is predominantly accomplished through covalent interaction.

The surface treatment or else surface modification which leads to a shell around the encased entity, in the present case the metal hydroxide, especially the aluminum hydroxide, is described extensively in the literature. A reference work in which suitable materials and also the coating technique are described is "Particulate-Filled Polymer Composites" (2nd Edition), edited by: Rothon, Roger N., 2003, Smithers Rapra Technology. Chapter 4 is of particular relevance. Corresponding materials are commercially available, for example from Nabaltec, Schwandorf or Martinswerke in Bergheim, both in Germany.

Preferred coating materials are saturated or unsaturated polymers having an acid function, preferably having at least one acrylic acid or acid anhydride, preferably maleic anhydride, since these add onto the surface of the metal hydroxide in a particularly efficient manner.

The polymer is one polymer or mixtures of polymers, preference being given to one polymer. Preferred polymers are polymers of mono- and diolefins, mixtures thereof, copolymers of mono- and diolefins with one another or with other vinyl monomers, polystyrene, poly(p-methylstyrene), poly(alpha-methylstyrene), copolymers of styrene or alpha-methylstyrene with dienes or acryloyl derivatives, graft copolymers of styrene or alpha-methylstyrene, halogenated polymers, polymers which derive from alpha,beta-unsaturated acids and derivatives thereof, and copolymers of these monomers with one another or with other unsaturated monomers.

Likewise preferred coating materials are monomeric organic acids and salts thereof, preferably saturated fatty acids; less commonly used are unsaturated acids. Preferred fatty acids comprise 10 to 30 carbon atoms, preferably 12 to 22 and especially 16 to 20 carbon atoms; they are aliphatic and preferably have no double bonds. Very particular preference is given to stearic acid. Preferred fatty acid derivatives are the salts thereof, preferably calcium, aluminum, magnesium or zinc. Particular preference is given to calcium, especially in the form of calcium stearate.

Other preferred substances which form a shell around the metal hydroxide, preferably the aluminum hydroxide, are organosilane compounds having the following structure:

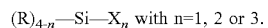

$(R)_{4-n}$—Si—$X_n$ with n=1, 2 or 3.

X is a hydrolyzable group which reacts with the surface of the metal hydroxide, also referred to as coupling group. Preferably, the R radical is a hydrocarbyl radical and is chosen such that the organosilane compound has good miscibility with the thermoplastic polyurethane. The R radical is bonded to the silicon via a hydrolytically stable carbon-silicon bond and may be reactive or inert. One example of a reactive radical, which is preferably an unsaturated hydrocarbyl radical, is an allyl radical. Preferably, the R radical is inert and is further preferably a saturated hydrocarbyl radical having 2 to 30 carbon atoms, preferably 6 to 20 carbon atoms and more preferably 8 to 18 carbon atoms; further preferably, it is an aliphatic hydrocarbyl radical which is branched or linear.

Further preferably, the organosilane compound comprises only one R radical and has the general formula:

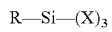

Preferably, the coupling group X is a halogen, preferably chlorine, and accordingly the coupling reagent is a tri-, di- or monochlorosilane. Likewise preferably, the coupling group X is an alkoxy group, preferably a methoxy or ethoxy group. Very preferably, the radical is the hexadecyl radical, preferably with the methoxy or ethoxy coupling group; thus, the organosilane is hexadecylsilane.

The silanes are applied to the metal hydroxide in an amount of 0.1% by weight to 5% by weight, further preferably 0.5% by weight to 1.5% by weight and more preferably in an amount of about 1% by weight, based on the total amount of the metal hydroxide. Carboxylic acids and derivatives are applied to the metal hydroxide in an amount of 0.1% by weight to 5% by weight, further preferably in an amount of 1.5% by weight to 5% by weight and more preferably in an amount of 3% by weight to 5% by weight, based on the total amount of the metal hydroxide.

Of the metal hydroxides partly enveloped by a shell, preferably more than 50%, further preferably more than 70% and further preferably more than 90% have maximum dimension of less than 10 μm, preferably less than 5 μm, more preferably less than 3 μm. At the same time, at least 50% of the particles, preferably at least 70% and further preferably at least 90% have at least one maximum dimension of more than 0.1 μm, further preferably of more than 0.5 μm and more preferably more than 1 μm.

Preferably, in the preparation of the thermoplastic polyurethanes of the invention, metal hydroxides that have already been coated are used. Only in this way can unwanted side reactions of the coating materials with the constituents of the thermoplastic polyurethane be avoided, and the advantage of the prevention of oxidative degradation of the thermoplastic polyurethane comes to bear particularly efficiently. Further preferably, the coating of the metal hydroxide can also be effected in the intake region of the extruder, before the polyurethane is added in a downstream part of the extruder.

In a further embodiment, the present invention accordingly also relates to a composition as described above, wherein the metal hydroxide is at least partly enveloped by a shell.

Phosphorus-Containing Flame Retardants

The compositions of the invention comprise at least one phosphorus-containing flame retardant. According to the invention, it is possible in principle to use any known phosphorus-containing flame retardants for thermoplastic polyurethanes.

Preference is given, in the context of the present invention, to using derivatives of phosphoric acid, derivatives of phosphonic acid or derivatives of phosphinic acid or mixtures of two or more of these derivatives.

Accordingly, the present invention, in a further embodiment, also relates to a composition as described above, wherein the phosphorus-containing flame retardant is selected from the group consisting of derivatives of phosphoric acid, derivatives of phosphonic acid, derivatives of phosphinic acid and a mixture of two or more of these derivatives.

In a further preferred embodiment, the phosphorus-containing flame retardant is liquid at 21° C.

Preferably, the derivatives of phosphoric acid, phosphonic acid or phosphinic acid are salts with an organic or inorganic cation or organic esters. Organic esters are derivatives of the phosphorus-containing acids in which at least one oxygen atom bonded directly to the phosphorus has been esterified with an organic radical. In a preferred embodiment, the organic ester is an alkyl ester, and in another preferred embodiment an aryl ester. More preferably, all hydroxyl groups of the corresponding phosphorus-containing acid have been esterified.

Organic phosphate esters are preferred, particularly the triesters of phosphoric acid, such as trialkyl phosphates and especially triaryl phosphates, for example triphenyl phosphate.

Preference is given in accordance with the invention to using, as flame retardants for thermoplastic polyurethanes, phosphoric esters of the general formula (I)

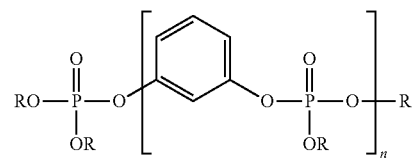

where R represents optionally substituted alkyl, cycloalkyl or phenyl groups and n=1 to 15.

If R in the general formula (I) is an alkyl radical, especially useful are those alkyl radicals having 1 to 8 carbon atoms. One example of cycloalkyl groups is the cyclohexyl radical. Preference is given to using those phosphoric esters of the general formula (I) in which R=phenyl or alkyl-substituted phenyl. n in the general formula (I) is especially 1 or is preferably in the range from about 3 to 6. Examples of preferred phosphoric esters of the general formula (I) include phenylene 1,3-bis(diphenyl) phosphate, phenylene 1,3-bis(dixylenyl) phosphate and the corresponding oligomeric products having a mean oligomerization level of n=3 to 6. A preferred resorcinol is resorcinol bis(diphenyl phosphate) (RDP), which is typically present in oligomers.

Further preferred phosphorus-containing flame retardants are bisphenol A bis(diphenyl phosphate) (BDP), which is typically in oligomeric form, and diphenyl cresyl phosphate (DPK).

Accordingly, the present invention also relates, in a further embodiment, to a composition as described above, wherein the phosphorus-containing flame retardant is selected from the group consisting of resorcinol bis(diphenyl phosphate) (RDP), bisphenol A bis(diphenyl phosphate) (BDP) and diphenyl cresyl phosphate (DPK).

In a further embodiment, the present invention accordingly also relates to a composition as described above, wherein the phosphorus-containing flame retardant is resorcinol bis(diphenyl phosphate) (RDP).

The organic phosphonates are salts with an organic or inorganic cation or the esters of phosphonic acid. Preferred esters of phosphonic acid are the diesters of alkyl- or phenylphosphonic acids. Examples of the phosphonic esters for use as flame retardants in accordance with the invention include the phosphonates of the general formula (II)

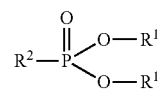

where
R$^1$ represents optionally substituted alkyl, cycloalkyl or phenyl groups, where the two R$^1$ radicals may also be joined to one another in a cycle, and
R$^2$ is an optionally substituted alkyl, cycloalkyl or phenyl radical.

Particularly suitable are cyclic phosphonates, for example

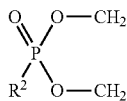 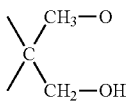 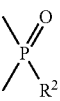

with R$^2$=CH$_3$ and C$_6$H$_5$, which derive from pentaerythritol, or

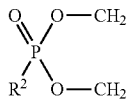 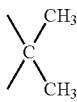

with R$^2$=CH$_3$ and C$_6$H$_5$, which derive from neopentyl glycol, or

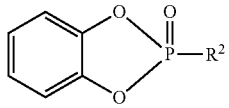

with R$^2$=CH$_3$ and C$_6$H$_5$, which derive from catechol, or else

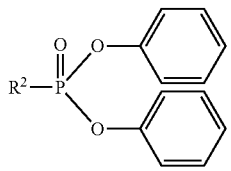

with R$^2$=an unsubstituted or else substituted phenyl radical.

Phosphinic esters have the general formula R$^1$R$^2$(P=O)OR$^3$ where all three organic groups R$^1$, R$^2$ and R$^3$ may be the same or different. The R$^1$, R$^2$ and R$^3$ radicals are either aliphatic or aromatic and have 1 to 20 carbon atoms, preferably 1 to 10 and further preferably 1 to 3. Preferably, at least one of the radicals is aliphatic, preferably all the radicals are aliphatic, and most preferably R$^1$ and R$^2$ are ethyl radicals. Further preferably, R$^3$ is also an ethyl radical or a methyl radical. In a further preferred embodiment, R$^1$, R$^2$ and R$^3$ are simultaneously ethyl radical or methyl radicals.

Preference is also given to phosphinates, i.e. the salts of phosphinic acid. The R$^1$ and R$^2$ radicals are either aliphatic or aromatic and have 1 to 20 carbon atoms, preferably 1 to 10 and further preferably 1 to 3. Preferably, at least one of the radicals is aliphatic, preferably all the radicals are aliphatic, and most preferably R$^1$ and R$^2$ are ethyl radicals. Preferred salts of the phosphinic acids are aluminum, calcium or zinc salts. A preferred embodiment is diethylaluminum phosphinate.

The phosphorus-containing flame retardants, salts thereof and/or derivatives thereof are used in the compositions of the invention as a single substance or in mixtures.

In the context of the present invention, the at least one phosphorus-containing flame retardant is used in a suitable amount. Preferably, the at least one phosphorus-containing flame retardant is present in an amount in the range from 2% by weight to 20% by weight, further preferably in the range from 2.5% by weight to 10% by weight and especially preferably in the range from 3% by weight to 5% by weight, based in each case on the overall composition.

In a further embodiment, the present invention therefore relates to a composition as described above, wherein the proportion of the phosphorus-containing flame retardant is in the range from 2% to 20% based on the overall composition.

In a preferred embodiment, the composition of the invention comprises resorcinol bis(diphenyl phosphate) (RDP) as phosphorus-containing flame retardant. In a further preferred embodiment, the composition of the invention comprises resorcinol bis(diphenyl phosphate) (RDP) as phosphorus-containing flame retardant and aluminum hydroxide.

By the combination of the various flame retardants and of the thermoplastic polyurethane TPU-1 based on an aliphatic diisocyanate used, and optionally of the thermoplastic polyurethane TPU-2 based on an aromatic diisocyanate used, mechanical properties and flame retardancy properties are optimized to the particular requirement.

According to the present invention, the phosphorus-containing flame retardant, especially the phosphoric esters, phosphonic esters and/or phosphinic esters and/or salts thereof, are used in a mixture together with at least one metal hydroxide as flame retardant. The weight ratio of the sum total of the weight of the phosphate esters, phosphonate esters and phosphinate esters used to the weight of the metal hydroxide used in the composition of the invention is preferably in the range from 1:8 to 1:12.

The present invention also relates to the use of the composition of the invention comprising at least one flame-retardant thermoplastic polyurethane as described above for production of coatings, damping elements, bellows, films or fibers, shaped bodies, floors for buildings and transport, nonwovens, preferably seals, rollers, shoe soles, hoses, cables, cable connectors, cable sheaths, cushions, laminates, profiles, belts, saddles, foams, plug connectors, trailing cables, solar modules, automobile trim. Preference is given to the use for production of cable sheaths. The production is preferably effected from pellets, by injection molding, calendaring, powder sintering or extrusion and/or by additional foaming of the composition of the invention.

Accordingly, the present invention also relates to the use of a composition comprising at least one thermoplastic polyurethane TPU-1 based on an aliphatic diisocyanate, at least one metal hydroxide and at least one phosphorus-containing flame retardant, as described above for production of cable sheaths. Further-improved properties for the application in cable sheaths are obtained for compositions comprising at least one thermoplastic polyurethane TPU-1 based on an aliphatic diisocyanate, at least one metal hydroxide and at least one phosphorus-containing flame retardant, wherein the composition further at least one thermoplastic polyurethane TPU-2 based on an aromatic diisocyanate.

Further embodiments of the present invention can be inferred from the claims and the examples. It will be appreciated that the features of the inventive subject matter/processes/uses which have been mentioned above and those elucidated below can be used not only in the combination specified in each case but also in other combinations, without leaving the scope of the invention. For example, the combination of a preferred feature with an especially preferred feature or of a feature which is not characterized any further with an especially preferred feature, etc., is implicitly also encompassed even if this combination is not mentioned explicitly.

Listed herein after are illustrative embodiments of the present invention, though these do not restrict the present invention. More particularly, the present invention also encompasses those embodiments which arise from the dependency references and hence combinations specified hereinafter.

1. A composition comprising at least one thermoplastic polyurethane TPU-1 based on an aliphatic diisocyanate, at least one metal hydroxide and at least one phosphorus-containing flame retardant.
2. The composition according to embodiment 1, wherein the composition further comprises at least one thermoplastic polyurethane TPU-2 based on an aromatic diisocyanate.
3. The composition according to embodiment 2, wherein the proportion of the thermoplastic polyurethane TPU-2 in the composition is in the range from 0.1% to 65% based on the overall composition.
4. The composition according to either of embodiments 2 and 3, wherein the thermoplastic polyurethane TPU-1 has a Shore hardness in the range from 85 A to 65 D, determined in accordance with DIN ISO 7619-1.
5. The composition according to any of embodiments 1 to 4, wherein the thermoplastic polyurethane TPU-1 is based on at least one aliphatic diisocyanate selected from the group consisting of hexamethylene diisocyanate and di(isocyanatocyclohexyl) methane.
6. The composition according to any of embodiments 1 to 5, wherein the thermoplastic polyurethane TPU-1 has a molecular weight in the range from 100 000 Da to 400 000 Da.
7. The composition according to any of embodiments 2 to 6, wherein the thermoplastic polyurethane TPU-2 is based on diphenylmethane diisocyanate (MDI).
8. The composition according to any of embodiments 2 to 7, wherein the thermoplastic polyurethane TPU-2 has a Shore hardness in the range from 80 A to 95 A, determined in accordance with DIN ISO 7619-1.
9. The composition according to any of embodiments 1 to 8, wherein the thermoplastic polyurethane TPU-2 has a molecular weight in the range from 50 000 to 150 000 Da.
10. The composition according to any of embodiments 1 to 9, wherein the metal hydroxide is selected from the group consisting of aluminum hydroxides, aluminum oxide hydroxides, magnesium hydroxide and a mixture of two or more of these hydroxides.
11. The composition according to any of embodiments 1 to 10, wherein the metal hydroxide is aluminum hydroxide.
12. The composition according to any of embodiments 1 to 11, wherein the metal hydroxide is at least partly enveloped by a shell.
13. The composition according to any of embodiments 1 to 12, wherein the phosphorus-containing flame retardant is selected from the group consisting of derivatives of phosphoric acid, derivatives of phosphonic acid, derivatives of phosphinic acid and a mixture of two or more of these derivatives.
14. The composition according to any of embodiments 1 to 13, wherein the phosphorus-containing flame retardant is selected from the group consisting of resorcinol bis(diphenyl phosphate) (RDP), bisphenol A bis(diphenyl phosphate) (BDP) and diphenyl cresyl phosphate (DPK).
15. The composition according to any of embodiments 1 to 14, wherein the proportion of the thermoplastic polyurethane TPU-1 in the composition is in the range from 5% to 35% based on the overall composition.
16. The composition according to any of embodiments 2 to 15, wherein the proportion of the thermoplastic polyurethane TPU-2 in the composition is in the range from 15% to 65% based on the overall composition.
17. The composition according to any of embodiments 1 to 16, wherein the proportion of the metal hydroxide in the composition is in the range from 25% to 65% based on the overall composition.
18. The composition according to any of embodiments 1 to 17, wherein the proportion of the phosphorus-containing flame retardant is in the range from 2% to 20% based on the overall composition.
19. The use of a composition according to any of embodiments 1 to 18 for production of cable sheaths.
20. A composition comprising at least one thermoplastic polyurethane TPU-1 based on an aliphatic diisocyanate, at least one metal hydroxide and at least one phosphorus-containing flame retardant, wherein the composition further comprises at least one thermoplastic polyurethane TPU-2 based on an aromatic diisocyanate.

The examples which follow serve to illustrate the invention, but are in no way restrictive with respect to the subject matter of the present invention.

EXAMPLES

The examples show the improved flame retardancy of the compositions of the invention, the good mechanical properties and the lower smoke gas density.

1. Feedstocks

Elastollan 1185A10: TPU of Shore hardness 85 A from BASF Polyurethanes GmbH, Elastogranstrasse 60, 49448 Lemförde, based on polytetrahydrofuran polyol (PTHF) having a molecular weight of 1000, butane-1,4-diol, MDI.

Elastollan L 1160D10: TPU of Shore hardness 60 D from BASF Polyurethanes GmbH. Elastogranstrasse 60, 49448 Lemförde, based on polytetrahydrofuran polyol (PTHF) having a molecular weight of 1000, butane-1,4-diol, $H_{12}$MDI.

Elastollan A: TPU of Shore hardness 87 A, experimental material, based on a polycarbonatediol from Ube (Eternacoll PH-200D), butane-1,4-diol, MDI.

Apyral 40 HS1: aluminum hydroxide having a hydrophobic surface coating based on about 1% hexadecylsilane, Nabaltec AG, Alustrasse 50-52, D-92421 Schwandorf, Al(OH)$_3$ content [%]≈99.5, particle size (laser diffraction) [μm] D50: 1.4, specific surface area (BET) [m$^2$/g]: 3.5.

Cloisite 5: organically modified nanodispersible sheet silicate based on natural bentonites, Rockwood Clay Additives GmbH. Stadtwaldstraße 44, D-85368 Moosburg, powder, median particle size D50 (i.e. at least 50% of the particles smaller than) 40 μm.

ETERNACOLL® PH 200D: copolycarbonatediol based on the diols pentane-1,5-diol and hexane-1,6-diol, having a molecular weight $M_n$ of about 2000.

Fyrolflex RDP: resorcinol bis(diphenyl phosphate). CAS #: 125997-21-9, Supresta Netherlands B.V., Office Park De Hoef, Hoefseweg 1, 3821 AE Amersfoort, The Netherlands.

Crodamide ER BEAD: erucamide, CAS #: 112-84-5, Croda Europe Limited, Cowick Hall, Snaith, Goole, East Riding of Yorkshire, DN14 9AA, GB 2. Production of Elastollan A in a Manual Casting Method The amount of polyol stipulated in the underlying formulation (table 1) and of the chain extender is weighed into the tin can and blanketed briefly with nitrogen. The can is closed with a lid and heated up to 90° C. in the heating cabinet.

A further heating cabinet for heat treatment of the slab is preheated to 80° C. The Teflon dish is placed onto the hotplate and the latter is adjusted to 125° C.

The calculated amount of liquid isocyanate is determined by volumetric measurement. For this purpose, the liquid isocyanate (volumetric measurement of MDI is conducted at a temperature of about 48° C.) is weighed out in a PE cup and poured out into a PE cup within 10 s. Subsequently, the cup thus emptied is tared and charged with the calculated amount of isocyanate. In the case of MDI, the latter is stored at about 48° C. in the heating cabinet.

Additions such as hydrolysis stabilizer, antioxidant, etc. that are in solid form at RT are weighed in directly.

The preheated polyol is placed beneath the stirrer at rest on a lab jack. Subsequently, the reaction vessel is raised with the lab jack until the stirrer paddles are immersed completely into the polyol.

Before the stirrer motor is switched on, make absolutely sure that the speed controller is in the zero position. Subsequently, the speed is turned up gradually, such that good mixing is ensured without stirring air in.

Subsequently, additives, for example antioxidants, are added to the polyol.

The temperature of the reaction mixture is cautiously adjusted to 80° C. with a hot air gun.

If required, prior to the addition of isocyanate, catalyst is metered into the reaction mixture with a microliter syringe. At 80° C., isocyanate is then added, by introducing the amount previously determined by volumetric measurement into the reaction mixture within 10 s. The weight is checked by re-weighing. Deviations greater than/less than 0.2 g of the amount of formulation are documented. With the addition of the isocyanate, the stopwatch is started. On attainment of 110° C., the reaction mixture is poured out into the Teflon dishes preheated to 125° C.

10 min after the stopwatch has been started, the slab is removed from the hotplate and then stored in the heating cabinet at 80° C. for 15 h. The cooled slab is comminuted in a cutting mill. The pellets are dried at 110° C. for 3 h and stored under dry conditions.

In principle, this method can be applied to the reaction extruder or the belt method.

TABLE 1

| Formulation for Elastollan A and B: | |
|---|---|
| Polycarbonatediol | 1000 g |
| Lupranat MET | 460 g |
| Butane-1,4-diol | 115 g |
| Elastostab H01 | 33 g |
| Irganox 1125 | 33 g |

For the production of Elastollan A, the polycarbonatediol used is a polycarbonatediol from Ube (Eternacoll PH-200D).

Production of the mixtures

Table 2 below lists compositions in which the individual constituents are stated in parts by weight (PW). The mixtures were each produced with a Berstoff ZE 40 A twin-screw extruder having a screw length of 35 D divided into 10 barrel sections.

3. Mechanical Properties

The mixtures were extruded with an Arenz single-screw extruder having a three-zone screw with a mixing section (screw ratio 1:3) to give films having a thickness of 1.6 mm. MFR, density, Shore hardness, tensile strength, tear resistance and elongation at break and of the corresponding test specimens were measured.

The mixture II of the invention has a significantly higher tensile strength and a higher tear resistance with the same MFR.

4. Flame Retardancy

In order to assess flame retardancy, a test specimen having a thickness of 1.6 mm is tested in accordance with UL 94V (UL Standard for Safety for Tests for Flammability of Plastic Materials for Parts in Devices and Appliances). All mixtures were classified as V-0 in the thickness of 1.6 mm. But differences were apparent in the respective afterburn times.

For mixture II, slightly longer afterburn times were determined.

In order to assess flame retardancy, cables were produced on a conventional extrusion line (smooth tube extruder, extruder diameter 45 mm) for cable insulation and cable sheathing. A conventional three-zone screw with a compression ratio of 2.5:1 was employed.

First of all, the cores (16 twisted individual wires) were insulated with the respective mixtures with 0.3 mm of the respective mixtures in a tubular method. The diameter of the insulated cores was 1.8 mm. Three of these cores were stranded and a shell (shell thickness 1 mm, 2 mm in the gap) was applied by extrusion in a printing method. The external diameter of the overall cable was 6.3 mm.

Then a VW 1 test (UL Standard 1581, § 1080-VW-1 (vertical specimen) flame test) was conducted on the cables. The test was conducted on 3 cables in each case.

For mixture I and II, the test was passed three times.

5. Smoke Gas Density

In order to assess the smoke gas densities, measurements in accordance with ASTM E 662 were conducted on test specimens of thickness 1.6 mm. For mixtures I and II, comparable smoke gas densities were determined.

TABLE 2

| | Mixtures | |
|---|---|---|
| | I* | II |
| Elastollan A | 30 | 25 |
| L1160D10 | | 14.85 |
| Apyral HS1 | 55 | 55 |
| Chrodamide ER BEAD | 0.15 | 0.15 |
| Elvax 260A | 9.85 | |
| Fyrolflex RDP | 5 | 5 |

TABLE 2-continued

| | | | Mixtures | |
|---|---|---|---|---|
| | | | I* | II |
| Mechanical properties | | | | |
| MFR 180° C./5 kg | [g/10 min] | | 4 | 4 |
| Density | [g/cm3] | DIN EN ISO 1183-1, A | 1.57 | 1.59 |
| Shore A hardness | [A] | DIN 53505 | 91 | 92 |
| Tensile strength | [MPa] | DIN EN ISO 527 | 11 | 19 |
| Elongation at break | [%] | DIN EN ISO 527 | 460 | 420 |
| Tear propagation resistance | [kN/m] | DIN ISO 34-1, B (b) | 29 | 42 |
| Flame tests | | | | |
| VW1 test conducted/passed | | UL Standard 1581, §1080 t | 3/3 | 3/3 |
| Afterburn time 1/afterburn time 2 | [s] | UL 94V, 1.6 mm | 0/3 | 0/0 |
| Smoke gas density | | | | |
| Corrected maximum of specific smoke gas density | | ASTM E 662 | 189 | 183 |

*Comparative example

For mixtures I and II, similar smoke gas densities and similar flame retardancies were determined. However, Mixture II has significantly higher tensile strengths and tear resistances.

The invention claimed is:

1. A composition comprising at least one thermoplastic polyurethane TPU-1 based on an aliphatic diisocyanate, at least one metal hydroxide and at least one phosphorus-containing flame retardant,
   wherein the composition further comprises at least one thermoplastic polyurethane TPU-2 based on an aromatic diisocyanate, and
   wherein the proportion of the thermoplastic polyurethane TPU-2 in the composition is in the range from 0.1% to 65% based on the overall composition.

2. The composition according to claim 1, wherein the proportion of the thermoplastic polyurethane TPU-2 in the composition is in the range from 18% to 55% based on the overall composition.

3. The composition according to claim 1, wherein the thermoplastic polyurethane TPU-1 has a Shore hardness in the range from 85 A to 65 D, determined in accordance with DIN ISO 7619-1.

4. The composition according to claim 1, wherein the thermoplastic polyurethane TPU-1 is based on at least one aliphatic diisocyanate selected from the group consisting of hexamethylene diisocyanate and di(isocyanatocyclohexyl)methane.

5. The composition according to claim 1, wherein the thermoplastic polyurethane TPU-1 has a molecular weight in the range from 100,000 Da to 400,000 Da.

6. The composition according to claim 1, wherein the thermoplastic polyurethane TPU-2 is based on diphenylmethane diisocyanate (MDI).

7. The composition according to claim 1, wherein the thermoplastic polyurethane TPU-2 has a Shore hardness in the range from 80 A to 95 A, determined in accordance with DIN ISO 7619-1.

8. The composition according to claim 1, wherein the thermoplastic polyurethane TPU-2 has a molecular weight in the range from 50,000 to 150,000 Da.

9. The composition according to claim 1, wherein the metal hydroxide is selected from the group consisting of aluminum hydroxides, aluminum oxide hydroxides, magnesium hydroxide and a mixture of two or more of these hydroxides.

10. The composition according to claim 1, wherein the metal hydroxide is aluminum hydroxide.

11. The composition according to claim 1, wherein the metal hydroxide is at least partly enveloped by a shell.

12. The composition according to claim 1, wherein the phosphorus-containing flame retardant is selected from the group consisting of derivatives of phosphoric acid, derivatives of phosphonic acid, derivatives of phosphinic acid and a mixture of two or more of these derivatives.

13. The composition according to claim 1, wherein the phosphorus-containing flame retardant is selected from the group consisting of resorcinol bis(diphenyl phosphate) (RDP), bisphenol A bis(diphenyl phosphate) (BDP) and diphenyl cresyl phosphate (DPK).

14. The composition according to claim 1, wherein the proportion of the thermoplastic polyurethane TPU-1 in the composition is in the range from 5% to 35% based on the overall composition.

15. The composition according to claim 1, wherein the proportion of the thermoplastic polyurethane TPU-2 in the composition is in the range from 15% to 65% based on the overall composition.

16. The composition according to claim 1, wherein the proportion of the metal hydroxide in the composition is in the range from 25% to 65% based on the overall composition.

17. The composition according to claim 1, wherein the proportion of the phosphorus-containing flame retardant is in the range from 2% to 20% based on the overall composition.

18. A method for production of cable sheaths, comprising applying the composition according to claim 1 to a cable sheath.

* * * * *

UNITED STATES PATENT AND TRADEMARK OFFICE
CERTIFICATE OF CORRECTION

PATENT NO. : 10,047,214 B2
APPLICATION NO. : 15/106677
DATED : August 14, 2018
INVENTOR(S) : Oliver Steffen Henze et al.

It is certified that error appears in the above-identified patent and that said Letters Patent is hereby corrected as shown below:

On the Title Page

Column 2:
Item (56), other publications, Line 6, delete "Eigenshaften" and insert -- Eigenschaften --, therefor.

In the Specification

In Column 4, Line 8:
Delete "naphthylene1" and insert -- naphthylene 1 --, therefor.

In Column 5, Line 1:
Delete "none-" and insert -- nona- --, therefor;
    Line 13, delete "N-methylmorpholine." and insert -- N-methylmorpholine, --, therefor.

In Column 8, Line 23:
Delete "Martinswerke" and insert -- Martinswerk --, therefor.

In Column 14, Lines 53-54:
Delete "diffra(tion)" and insert -- diffraction --, therefor;
    Line 64, delete "phosphate)." and insert -- phosphate), --, therefor.

In Column 15, Line 3:
Delete "GB" and insert -- GB. --, therefor.

In Column 16, Line 63:
Table 2, delete "Chrodamide" and insert -- Crodamide --, therefor.

Signed and Sealed this
Eighth Day of October, 2019

Andrei Iancu
*Director of the United States Patent and Trademark Office*